(12) United States Patent
Ruona et al.

(10) Patent No.: US 10,914,229 B2
(45) Date of Patent: Feb. 9, 2021

(54) CHARGE AIR COOLER CONDENSATION DISPERSION ELEMENT

(75) Inventors: William Charles Ruona, Farmington Hills, MI (US); Gopichandra Surnilla, West Bloomfield, MI (US); David Karl Bidner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2126 days.

(21) Appl. No.: 13/617,320

(22) Filed: Sep. 14, 2012

(65) Prior Publication Data
US 2014/0076289 A1 Mar. 20, 2014

(51) Int. Cl.
F02B 29/04 (2006.01)
F02M 29/04 (2006.01)
F02M 35/10 (2006.01)
F02M 26/05 (2016.01)

(52) U.S. Cl.
CPC ...... *F02B 29/0468* (2013.01); *F02B 29/0425* (2013.01); *F02M 29/04* (2013.01); *F02M 26/05* (2016.02); *F02M 35/1038* (2013.01); *F02M 35/10393* (2013.01); *Y02T 10/12* (2013.01)

(58) Field of Classification Search
USPC ............................................ 123/542; 701/42
See application file for complete search history.

(56) References Cited

U.S. PATENT DOCUMENTS

| | | | | |
|---|---|---|---|---|
| 3,572,657 A | * | 3/1971 | Bradley, Jr. | F28F 25/04 |
| | | | | 261/111 |
| 4,252,752 A | * | 2/1981 | Flandroy | F28B 1/06 |
| | | | | 165/175 |
| 5,289,699 A | * | 3/1994 | Nivens | 62/513 |
| 5,809,961 A | | 9/1998 | Morota et al. | |
| 6,073,446 A | | 6/2000 | Aeffner | |
| 7,011,080 B2 | * | 3/2006 | Kennedy | 123/568.12 |
| 2009/0188650 A1 | * | 7/2009 | Morgan | F28D 5/02 |
| | | | | 165/104.21 |
| 2009/0223493 A1 | * | 9/2009 | Rutherford | 123/542 |
| 2010/0229548 A1 | * | 9/2010 | Kardos | F02B 29/0475 |
| | | | | 60/599 |
| 2010/0300647 A1 | * | 12/2010 | Steurer et al. | 165/52 |
| 2011/0094219 A1 | * | 4/2011 | Palm | 60/599 |
| 2011/0173954 A1 | * | 7/2011 | Wenzel | F02M 25/0722 |
| | | | | 60/274 |
| 2011/0219768 A1 | | 9/2011 | Namimatsu et al. | |

FOREIGN PATENT DOCUMENTS

WO 03001039 A1 1/2003

* cited by examiner

Primary Examiner — David Hamaoui
Assistant Examiner — Ruben Picon-Feliciano
(74) Attorney, Agent, or Firm — Geoffrey Brumbaugh McCoy Russell LLP

(57) ABSTRACT

Embodiments for controlling condensate in a charge air cooler are provided. In one example, a charge air cooler comprises an inlet to admit charge air, a plurality of heat exchange passages to remove heat from the charge air, an outlet configured to discharge the charge air from the heat exchange passages to an intake passage upstream of an intake manifold of an engine, and a dispersion element extending at least partially across the outlet.

22 Claims, 5 Drawing Sheets

CHARGE AIR COOLER CONDENSATION DISPERSION ELEMENT

FIELD

The present disclosure relates to a charge air cooler for an internal combustion engine.

BACKGROUND AND SUMMARY

Turbocharged and supercharged engines may be configured to compress ambient air entering the engine in order to increase power. Because compression of the air may cause an increase in air temperature, a charge air cooler may be utilized to cool the heated air thereby increasing its density and further increasing the potential power of the engine. If the humidity of the ambient air is high, however, condensation (e.g., water droplets) may form on any internal surface of the charge air cooler that is cooler than the dew point of the compressed air. During transient conditions such as hard vehicle acceleration, these water droplets may be blown out of the charge air cooler and into the combustion chambers of the engine resulting in increased potential for engine misfire, loss of torque and engine speed, and incomplete combustion, for example.

One approach for reducing the amount of condensation entering the combustion chambers is disclosed in US Patent Application Publication 2011/0094219 A1. In the cited reference, a condensation trap for a charge air cooler that reduces the rate at which condensation enters the combustion chambers of the engine is disclosed. The condensation trap includes a reservoir for collecting the condensate and a tube for releasing the condensate back to the outlet duct.

The inventors herein have recognized various issues with the above system. In particular, the condensation trap is positioned downstream of the charge air cooler and thus can only collect condensation downstream from an outlet of the charge air cooler. This configuration may not adequately address condensation trapped within the charge air cooler. Furthermore, condensation traps necessitate additional componentry that may increase the cost and the packaging space of the charge air cooler.

As such, one example approach to address the above issues includes a charge air cooler comprising an inlet to admit charge air, a plurality of heat exchange passages to remove heat from the charge air, an outlet configured to discharge the charge air from the heat exchange passages to an intake passage upstream of an intake manifold of an engine, and a dispersion element extending at least partially across the outlet.

In this way, condensate that accumulates in the charge air cooler may be driven out of the cooler via movement of the charge air. The condensate may contact the dispersion element, where it may be dispersed into small droplets. The droplets may evaporate and combust in the cylinder with the fuel and charge air. The evaporated droplets may be less likely to cause misfire. Thus, by providing a dispersion element extending across the outlet, complicated condensate traps may be avoided while still controlling condensate to prevent misfire.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
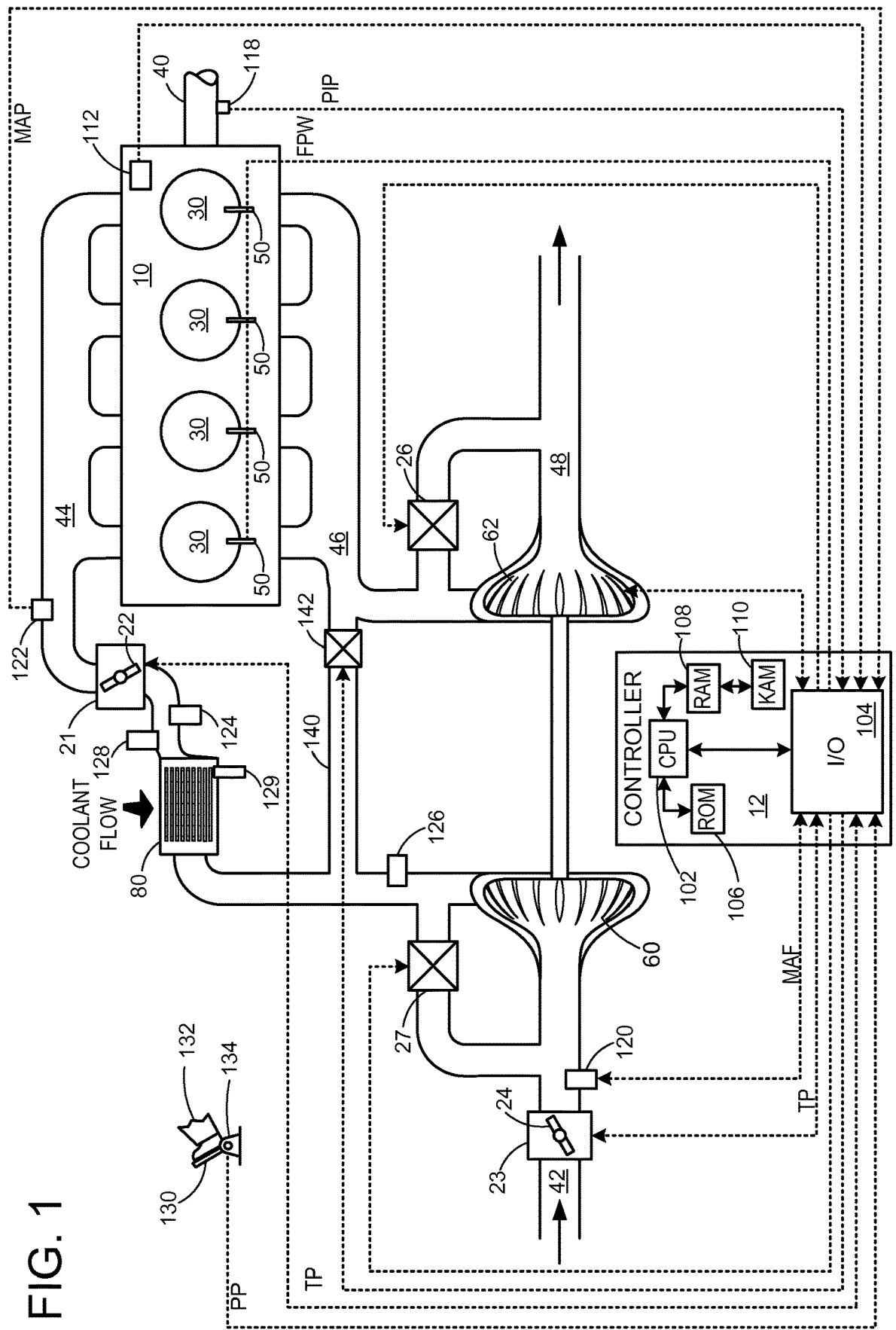
FIG. 1 is a schematic diagram of an example engine including a charge air cooler.
Figure 2:
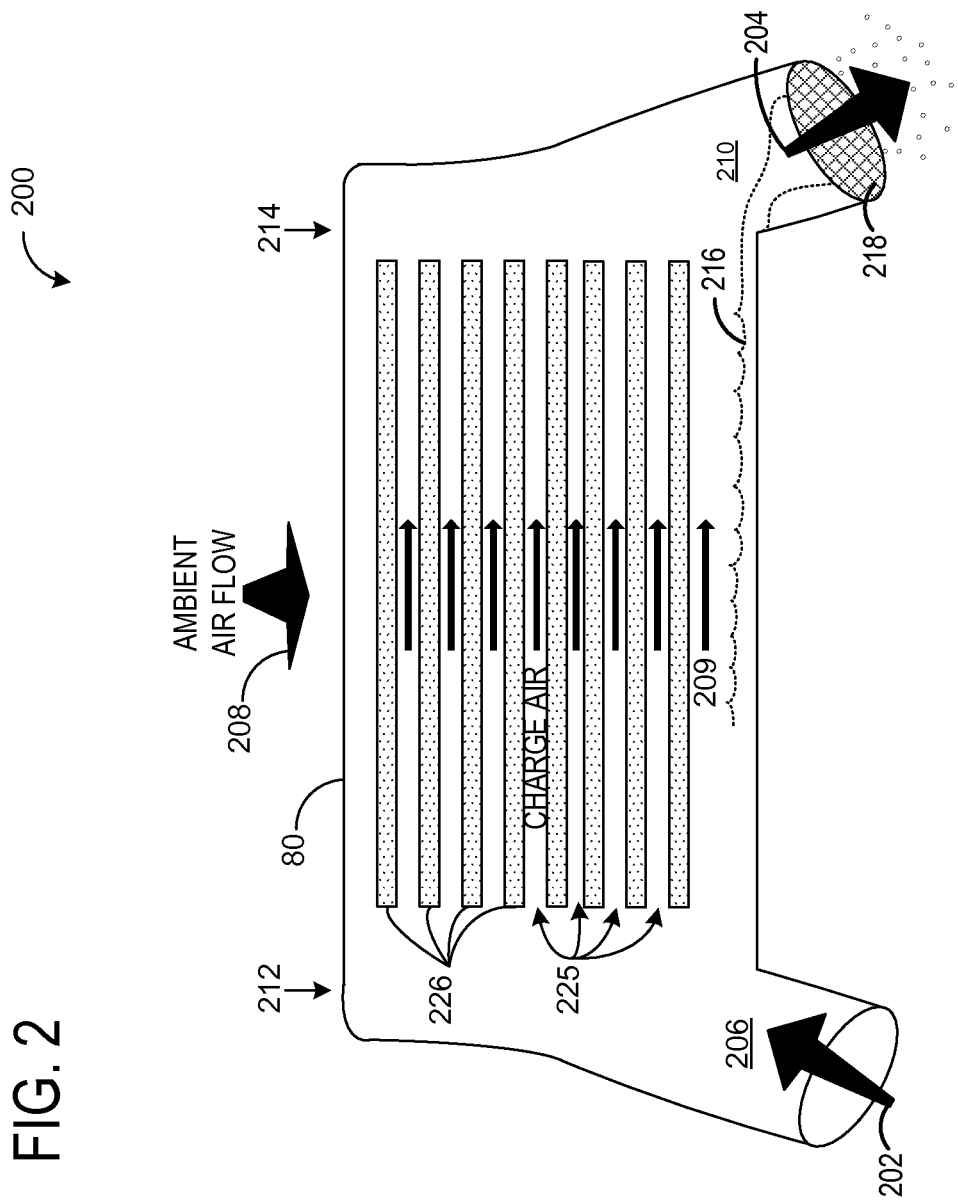
FIG. 2 is a schematic diagram of the charge air cooler of FIG. 1 including an example condensate dispersion system.
Figure 3:
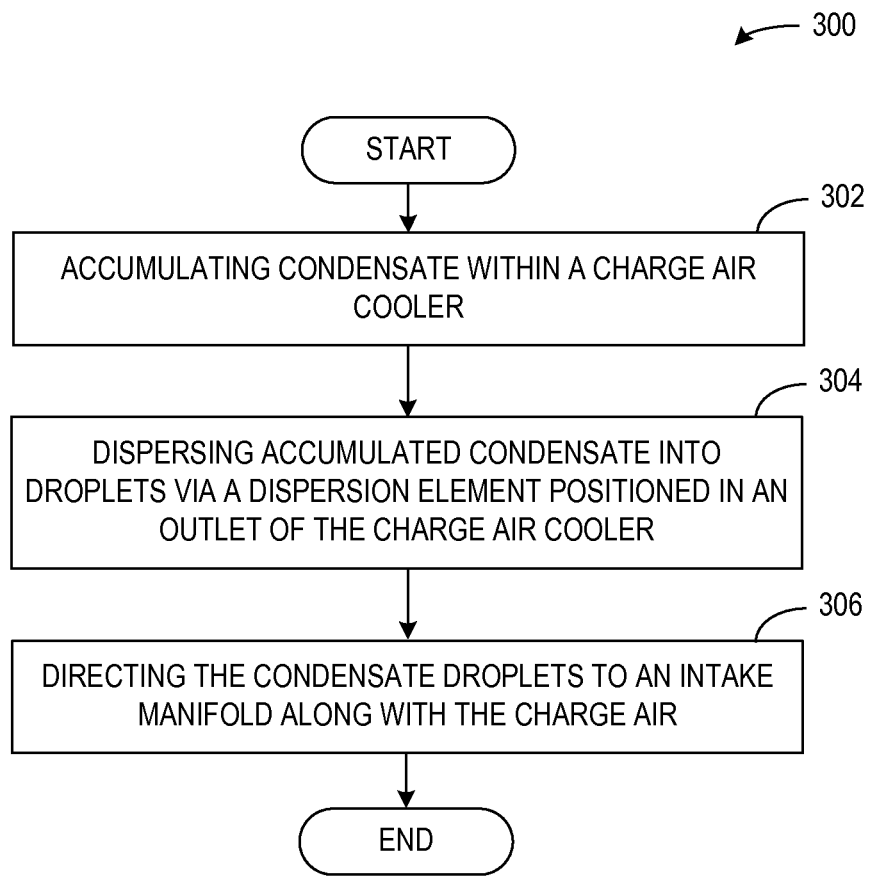
FIG. 3 is a flow chart illustrating an example method for dispersing condensate.
Figure 4:
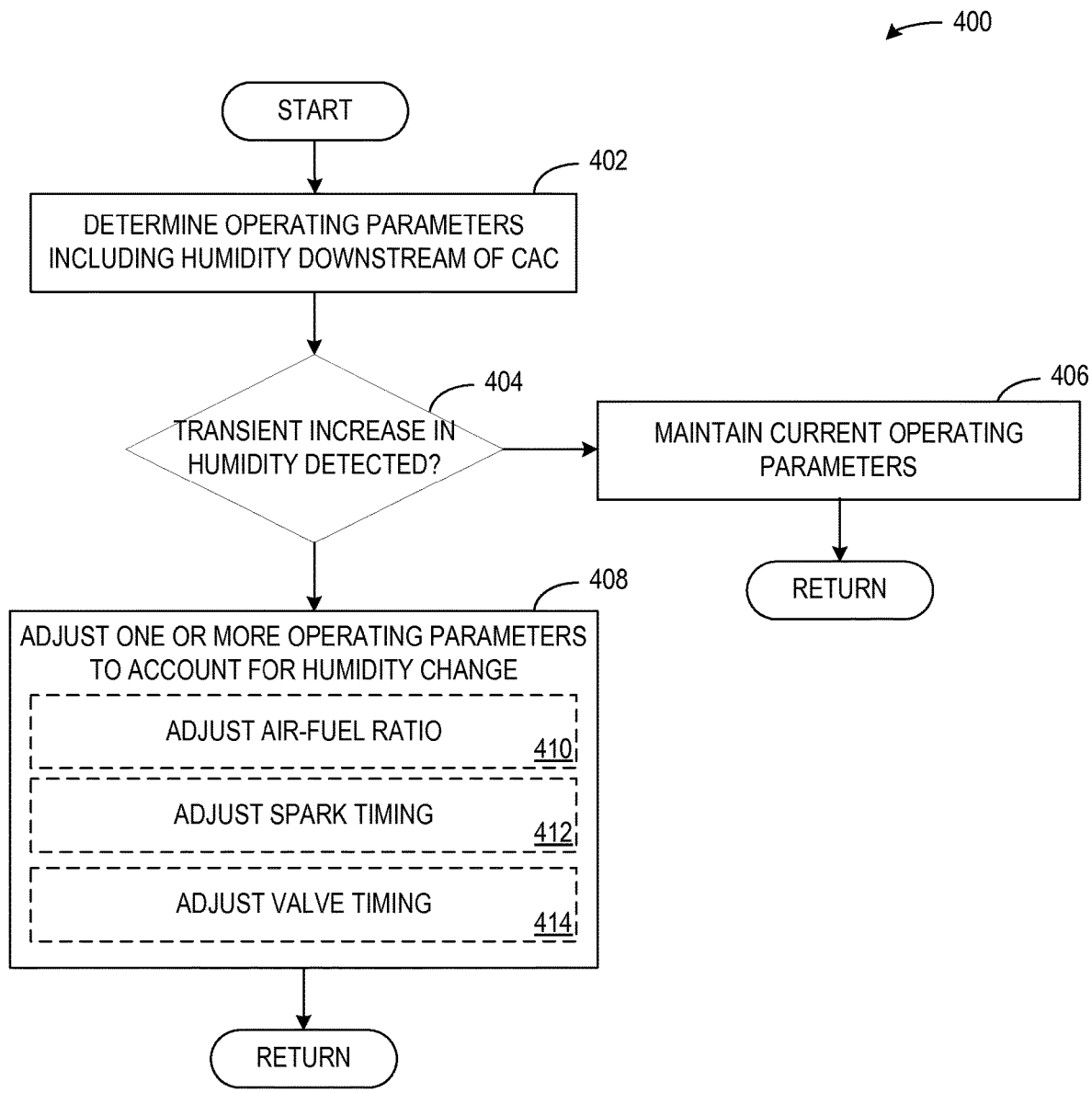
FIG. 4 is a flow chart illustrating an example method for adjusting operating parameters responsive to dispersed condensate.
Figure 5:
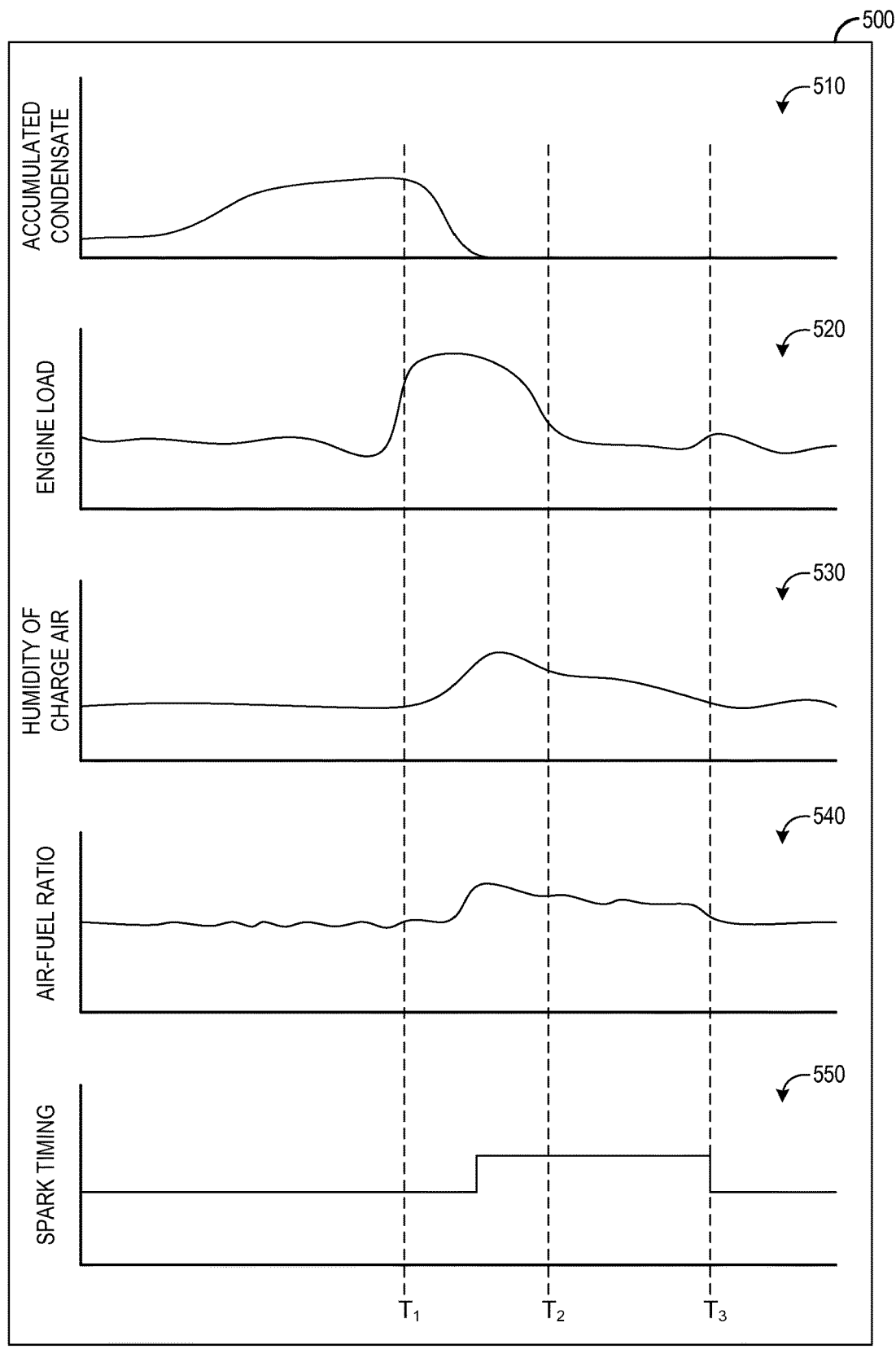
FIG. 5 is diagrams illustrating example engine operating parameters during a transient increase in humidity.

To reduce the likelihood that accumulated condensate in a charge air cooler will cause misfire or other combustion issues, a dispersion element, for example a screen, is positioned at the outlet of the charge air cooler. The accumulated condensate may contact the screen and disperse into small droplets and subsequently evaporate in the charge air moving to the intake manifold. The dispersed condensate may transiently increase the humidity of the intake air. To compensate for the increased humidity, one or more operating parameters of the engine may be adjusted. FIGS. 1-2 show example embodiments of a condensate dispersion system. The schematic diagram in FIG. 1 shows a turbocharged internal combustion engine with a charge air cooler. FIG. 2 shows a schematic diagram illustrating an example condensate dispersion system. A method for dispersing condensate is illustrated in FIG. 3 and a method for adjusting operating parameters in response to the dispersion of the condensate is illustrated in FIG. 4. FIG. 5 shows example operating parameters during the execution of the methods of FIGS. 3-4.

First, FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves. Further, intake and exhaust valves may be part of a variable valve timing system configured to open and close the valves at different timings depending on operating conditions.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42. For example, as depicted in FIG. 1, an additional throttle 23 having a throttle plate 24 is located upstream of compressor 60.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor recirculation valve (CRV) 27 configured to divert intake air around compressor 60. Wastegate 26 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. As described in more detail below, charge air cooler 80 may include a dispersion element to disperse accumulated condensate into droplets that may be evaporated by the moving charge air and directed to the intake manifold of the engine.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature sensor 124 at the outlet of the charge air cooler 80, and a boost pressure sensor 126. Additionally, one or more sensors 128 for detecting transient changes in humidity may be present downstream of charge air cooler 80. Sensors 128 may include a humidity sensor, an exhaust gas sensor positioned in the intake (such as an intake UEGO sensor), or other sensors that may detect humidity. Alternatively or additionally, a liquid sensor 129 may be present to detect condensate within charge air cooler 80. Other sensors not depicted may also be present, such as a sensor for determining the intake air velocity at the inlet of the charge air cooler, and other sensors. In some examples, storage medium read-only memory 106 may be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, ignition system, etc.

Referring now to FIG. 2, an embodiment of a condensate dispersion system is illustrated. FIG. 2 shows a front perspective view of a condensate dispersion system 200 in fluid communication with charge air cooler 80. The condensate dispersion system may be utilized to discharge condensate from the charge air cooler which may accumulate as the result of the high ambient air humidity. This may occur, for example, on surfaces of heat exchange passages within the charge air cooler when the surfaces are at a temperature less than the dew point of the ambient air entering the cooler. When condensation forms on these cooler surfaces it may pool at a low point of the charge air cooler, for example.

As shown in FIG. 2, the direction of engine airflow entering charge air cooler 80 is indicated generally by arrow 202, and engine airflow exiting charge air cooler 80 is indicated generally by arrow 204. However, it will be appreciated that engine air may enter and exit charge air cooler 80 at other airflow directions and the engine airflow as indicated by arrows 202 and 204 is provided as one non-limiting example. Likewise, other charge air cooler geometries than those depicted in FIG. 2 are possible without departing from the scope of this disclosure.

As introduced above, engine air may enter via a first engine air passage 206 upstream from charge air cooler 80. Engine air may then be cooled via heat exchange with ambient air, indicated generally at 208, and may then exit via a second engine air passage 210 downstream from charge air cooler 80. In other words, engine air enters at a hot side 212 of the charge air cooler and exits at a cold side 214 of the charge air cooler (directionality of charge air flow indicated generally by arrows 209), wherein 'hot' and 'cold' indicate a relative temperature of the engine air as it passes through the charge air cooler. In this way, ambient air 208 cools compressed engine air via heat exchange as the engine air passes through the charge air cooler. However, the compressed engine air entering the charge air cooler may condense, as described above. In this sense, first engine air passage 206 may deposit condensate within the charge air cooler.

As shown, charge air cooler 80 may include a plurality of heat exchange passages 225 and a plurality of ambient air passages 226. Heat exchange passages 225 may provide a conduit for charge air to be cooled by ambient air cross-flow passing through the plurality of ambient air passages 226. In this way, compressed engine air is cooled upstream from the combustion chambers.

Accumulated condensate 216 may pool at a low point of charge air cooler 80, such as along the bottom surface of charge air cooler. Accumulated condensate 216 may also pool along surfaces of the heat exchange passages 225. Under certain conditions, such as during a tip-in event, the accumulated condensate 216 may be swept out of the charge air cooler 80 via the second air passage 210, as shown by the dotted lines. If the condensate is allowed to reach the engine, it may cause engine misfire and combustion issues.

To prevent a slug of condensate from reach the engine, a dispersion element 218 may be positioned in the second air passage 210 to reduce the size of the condensate droplets. Dispersion element 218 may be a screen that at least partially extends across the opening of the second engine air passage 210, otherwise referred to as the outlet of the charge air cooler 80. In some embodiments, dispersion element 218 may extend fully across the outlet, while in other embodiments, dispersion element 218 may extend partially across the outlet. Dispersion element 218 may be a screen comprised of a mesh-like structure in one embodiment. The size and position of the openings of the mesh may be selected to break up condensate into droplets that are small enough to be evaporated once entrained in the charge air exiting the charge air cooler towards the intake manifold of the engine. In another embodiment, dispersion element 218 may be comprised of a plurality of parallel slats, positioned either parallel or perpendicular to the flow of charge air. The size and spacing of the slats may be optimized to disperse the condensate. Additionally, in some embodiments, multiple dispersion elements arranged in series may be present at the outlet of the charge air cooler.

It will be appreciated that the above description is non-limiting and components of the condensate dispersion system 200 may be of other suitable geometric configurations than those depicted in FIG. 2. Additionally, it will be appreciated that features of condensate dispersion system 200 may embody configurations other than those depicted without departing from the scope of this disclosure. For example, dispersion element 218 may be positioned in virtually any location within second engine air passage 210 or within the conduit connecting the charge air cooler to the intake passage downstream of the charge air cooler. Further, dispersion element 218 may have other configurations than those described above.

Thus, the systems described above with respect to FIGS. 1 and 2 provide for a charge air cooler comprising an inlet to admit charge air; a plurality of heat exchange passages to remove heat from the charge air; an outlet configured to discharge the charge air from the heat exchange passages to an intake passage upstream of an intake manifold of an engine; and a dispersion element extending at least partially across the outlet. The dispersion element may extend fully across the outlet.

The dispersion element may comprise screen having a mesh-like structure, or it may comprise a plurality of parallel slats. A second dispersion element extending at least partially across the outlet may be positioned in a downstream direction from the dispersion element.

The charge air deposits condensate on one or more surfaces of the charge air cooler, and the condensate may be swept out of the charge air cooler through the outlet under select conditions, such as an increase in engine load. The dispersion element is configured to disperse the swept condensate into droplets within the charge air.

In another example, an engine system comprises an intake passage coupled to an intake manifold of the engine, and a charge air cooler positioned in the intake passage between a compressor and the intake manifold, the charge air cooler comprising: an inlet; a heat exchanger; an outlet; and a dispersion element at least partially extending across the outlet. A humidity sensor may be positioned in the intake passage, for example downstream of the charge air cooler. A liquid sensor may be positioned in the charge air cooler. A gas sensor may be positioned in the intake passage, for example a UEGO may be positioned downstream of the charge air cooler. The dispersion element may extend partially or fully across the outlet, and the dispersion element may be comprised of a mesh-like structure, or it may be comprised of a plurality of parallel slats. One or more additional dispersion element may be arranged downstream of the dispersion element.

Turning to FIG. 3, a method 300 for dispersing condensate within a charge air cooler (such as charge air cooler 80) is provided. At 302, method 300 includes accumulating condensate within a charge air cooler. For example, charge air cooler 80 may accumulate condensate at a low point of the charge air cooler. Gravitational forces may result in condensation pooling at the low point, thus the low point serves as a natural reservoir for condensation to accumulate during engine operation.

At 304, method 300 includes dispersing the accumulated condensate into droplets via a dispersion element positioned in an outlet of the charge air cooler. For example, under select conditions, such as a large load increase, charge air moving though the charge air cooler may be of high enough velocity to entrain the accumulated condensate. The accumulated condensate may be driven to the outlet of the charge air cooler. As explained above with respect to FIG. 2, a dispersion element may be positioned at the outlet of the charge air cooler. When the entrained condensate is driven with the charge air to the outlet, the condensate may be dispersed via contact with the dispersion element. The condensate may be dispersed into small droplets sized to evaporate due to the movement of the charge air. Thus, at 306, method 300 includes directing the condensate droplets to an intake manifold along with the charge air. The condensate droplets may evaporate immediately upon contact with the screen, or they may evaporate in the intake passage, intake manifold, or combustion cylinder.

Thus, the presence of a dispersion element, such as a screen, at the outlet of the charge air cooler provides a mechanism for breaking up accumulated condensate into small droplets. These small droplets may evaporate in the charge air. The charge air, which is now of increased humidity, is combusted in the engine. By directing accumulated condensate in the form of water vapor rather than liquid, engine misfire and other combustion issues may be reduced or avoided. As explained previously, the dispersed condensate may transiently increase the humidity of the charge air reaching the engine. The increase in humidity may disrupt certain engine operating parameters. Thus, one or more sensors may be located downstream of the charge air cooler to detect transient changes in humidity, and engine operating parameters may be adjusted in response to the increased humidity.

FIG. 4 is a flow chart illustrating a method 400 for adjusting parameters responsive to humidity. Method 400 may be carried out by a controller, such as controller 12 of FIG. 1 in response to feedback from one or more humidity-detecting sensors, such as sensors 128 and/or 129. At 402, method 400 includes determining engine operating parameters including current humidity downstream of the charge air cooler. Humidity may be detected using a humidity sensor, an intake gas sensor, or other sensor. At 404, it is determined if a transient increase in humidity is detected. The transient increase in humidity may be an increase in humidity above current ambient humidity due to conditions in the charge air cooler. As explained above with respect to FIGS. 2 and 3, if condensate accumulates in the charge air cooler, under certain conditions such as a sudden increase in load, the condensate may be driven to the outlet of the charge air cooler, where it may be dispersed into small droplets. The droplets may then evaporate into the charge air, increasing the humidity detected by the sensors. Additionally or alternatively, the amount of accumulated condensate may be estimated based on operating parameters (such as ambient humidity, mass air flow, and charge air cooler inlet temperature), and if a sudden increase in load is detected, the level of increased humidity may be estimated based on the amount of accumulated condensate, assuming that the dispersion element will disperse the condensate and increase the humidity. If increased humidity is not detected, method 400 proceeds to 406 to maintain current operating parameters. Current operating parameters may include maintaining air-fuel ratio based on engine speed and load and feedback from exhaust gas sensors, spark timing set for maximum efficiency (e.g., maximum brake torque), and valve timing set for optimal dilution for fuel economy, emissions, and power. Method 400 then returns.

If a transient increase in humidity is detected, engine operating parameters may be adjusted at 408 in order to avoid or reduce misfire. For example, the valve timing may be set for optimal dilution that is near a misfire limit. If the humidity of the charge air increases above ambient humidity for which the operating parameters are set, the dilution of the cylinder increases, and thus misfire may occur. To compensate for the transiently increased humidity, one or more operating parameters may be adjusted. The engine operating parameters may be adjusted for a duration that is different than the duration of the transient condition that caused the increased humidity. For example, a transient load increase may last a first duration (e.g., five seconds). However, the time it takes for the humidity, which is now carried to the intake manifold by the charge air, to reach the cylinders and completely combust may be a second, longer duration (e.g., ten seconds). Thus, the operating parameters may be adjusted for a duration that is longer than the duration of the transient load increase.

Adjusted operating parameters may include adjusting air-fuel ratio at 410. For example, if humidity increases, the air-fuel ratio may be decreased, as the humidity in the air dilutes the charge air. Thus, an increased amount of fuel may be delivered to maintain torque. In other embodiments, the air-fuel ratio may be increased, in order to maintain the same amount of oxygen in the cylinder. Other operating parameters that may be adjusted include spark timing at 412 and valve timing at 414. In one example, spark may be advanced in response to increased humidity. Spark timing may be initially set to a timing, such as maximum brake torque (MBT), to provide optimal power and efficiency while avoiding knock. When humidity increases, the dilution of the charge in the cylinder increases, and combustion may undergo a slow burn. To ensure maximum power is obtained, spark timing may be temporarily advanced, in coordination with the extended release of water into the intake air caused by the dispersion element, to allow additional time for combustion. Upon adjusting operating parameters, method 400 returns.

FIG. 5 is a set of diagrams 500 illustrating engine operating parameters during a transient increase in humidity. The first diagram 510 from the top illustrates accumulated condensate in a charge air cooler, the second diagram 520 from the top illustrates engine load, the third diagram 530 from the top illustrates the humidity of the charge air (downstream of the charge air cooler), the fourth diagram 540 from the top illustrates air-fuel ratio, and the bottom diagram 550 illustrates spark timing. Air-fuel ratio and spark timing are two examples of an engine operating parameter discussed above that may be adjusted in response to a transient increase in humidity. For each illustrated diagram, time is depicted on the horizontal axis while a respective operating parameter is depicted on the vertical axis.

The first diagram 510 shows that condensate in the charge air cooler has accumulated, due for example to relatively humid and cold intake air. At time $T_1$, depicted by the first dotted line, the amount of accumulated condensate rapidly decreases until no condensate remains in the charge air cooler. The condensate may be removed from the charge air cooler due to a transient increase in load, which is illustrated in the second diagram 520. At time $T_1$, the engine load increases rapidly and is sustained for a first duration, until time $T_2$. This increase in load causes a larger amount of charge air to move through the charge air cooler at a higher velocity than under low load conditions, thus entraining the accumulated condensate and directing it to the outlet of the charge air cooler. As explained previously, a dispersion element positioned in the outlet of the charge air cooler acts to disperse the condensate into small droplets that evaporate in the moving charge air, causing an increase in the humidity downstream of the charge air cooler.

The third diagram 530 shows the increase in humidity, beginning after time $T_1$. The humidity increases more gradually than the load increase or the decrease in accumulated condensate. Further, the increase in humidity lasts longer than the load increase, as the increased humidity does not return to ambient levels until time $T_3$. During the period of increased humidity, the humidity increases by a larger amount initially, then gradually tapers off as the dispersed condensate is mixed in with the charge air and moved to the intake manifold of the engine.

To compensate for the increased humidity, one or more engine operating parameters may be adjusted, such as air-fuel ratio (depicted in the fourth diagram 540), valve timing, and/or spark timing (depicted in the bottom diagram 550). As shown in the fourth diagram 540, air-fuel ratio is maintained around a set value, for example stoichiometry, until an increase in humidity is detected. Then, as illustrated herein, the air-fuel ratio is increased to account for the increased humidity. The air-fuel ratio is increased until time $T_3$, in order to provide compensation during the entirety of the duration of increased humidity. Similarly, spark timing, as shown in the bottom diagram 550, may be set to a designated timing for the conditions (such as MBT). In response to the increase in humidity following time $T_1$, spark timing may be advanced until the humidity returns to its initial level at time $T_3$. Thus, one or both of air-fuel ratio and spark timing may be adjusted in response to the increased humidity. The adjustment to the air-fuel ratio and spark timing may be maintained for a greater duration than the duration of the transient load increase that caused the increased humidity, to account for the extended duration of increased humidity caused by the dispersion element. In one example, the duration may be more than twice the duration of the load transient.

Thus, the systems and methods described herein provide for a method for an engine. The method comprises flowing intake air through a charge air cooler with a dispersion element across its outlet, and adjusting one or more engine operating parameters in response to transient increased humidity downstream of the charge air cooler, the transient increased humidity formed due to dispersion of accumulated condensate in the charge air cooler via the dispersion element. During a transient increase in load, the intake air may flow through the charge air cooler at a velocity to direct the accumulated condensate across the dispersion element in order to disperse the accumulated condensate to form the transient increased humidity. The transient increase in load may comprise a first duration and the adjusting the one or more operating parameters may comprise a second duration, longer than the first duration. Adjusting one or more operating parameters may comprise adjusting air-fuel ratio (e.g., the air-fuel ratio may be decreased as humidity increases), adjusting spark timing, and/or adjusting valve timing.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A charge air cooler, comprising:
an inlet to admit charge air;
a plurality of heat exchange passages to remove heat from the charge air;
an outlet opening positioned at a charge air exit discharging charge air from the heat exchange passages to a downstream intake passage upstream of an engine intake manifold; and
a dispersion element including a mesh-like screen positioned at and extending fully across the outlet opening, the dispersion element uniformly patterned fully across the outlet opening, wherein the screen is positioned below all heat exchange passages.

2. An engine system comprising:
an intake passage coupled to an intake manifold of the engine; and
a charge air cooler positioned in the intake passage between a compressor and the intake manifold, the charge air cooler comprising:
an inlet;
a heat exchanger;
an outlet opening; and
a dispersion element comprising a mesh-like screen fully extending across the outlet opening, the outlet opening and dispersion element positioned below all heat exchange passages of the charge air cooler.

3. The engine system of claim 2, further comprising a humidity sensor positioned in the intake passage, the charge air cooler further comprising a top and a bottom surface, the bottom surface being a lower point of the charge air cooler, the dispersion element positioned below the bottom surface.

4. The engine system of claim 2, further comprising a liquid sensor positioned in the charge air cooler.

5. The engine system of claim 2, further comprising an exhaust gas sensor positioned in the intake passage.

6. The engine system of claim 5, wherein the exhaust gas sensor is a UEGO sensor.

7. The engine system of claim 6, further comprising a throttle positioned in the engine intake downstream of the UEGO sensor.

8. The charge air cooler of claim 2, wherein the dispersion element is a first screen, and further comprising a second dispersion element extending at least partially across the outlet opening in a downstream direction from the first dispersion element.

9. A method for an engine, comprising:
flowing intake air through a charge air cooler with a dispersion element comprising a mesh-like screen extending fully across its outlet opening;
flowing all of the intake air out of the charge air cooler through the outlet opening to an intake passage upstream of an intake manifold; and
adjusting one or more engine operating parameters in response to transient increased humidity downstream of the charge air cooler, the transient increased humidity formed due to dispersion of accumulated condensate in the charge air cooler via the dispersion element.

10. The method of claim 9, further comprising during a transient increase in load, flowing the intake air through the charge air cooler at a velocity to direct the accumulated condensate across the dispersion element in order to disperse the accumulated condensate to form the transient increased humidity.

11. The method of claim 10, wherein the transient increase in load comprises a first duration and wherein the adjusting the one or more operating parameters comprises a second duration, longer than the first duration.

12. The method of claim 9, wherein adjusting the one or more engine operating parameters comprises one or more of adjusting valve timing, spark timing, and air-fuel ratio.

13. The method of claim 9, wherein entrained condensate is driven with the intake air to the outlet opening, the condensate dispersed via contact with the dispersion element into droplets sized to evaporate due to the movement of the intake air.

14. The method of claim 13, wherein the dispersed condensate transiently increases the humidity of charge air reaching the engine, wherein one or more sensors, including a UEGO gas sensor, is located downstream of the charge air cooler but upstream of an intake throttle, to detect the transient changes in humidity, wherein the one or more engine operating parameters is adjusted in response to the increased humidity detected by the one or more sensors due to evaporated condensate.

15. The method of claim 13, wherein if a sudden increase in load is detected, a level of transient increased humidity may be estimated based on an amount of accumulated condensate, assuming that the dispersion element disperses the condensate and increases the humidity.

16. The method of 13, wherein if a transient increase in humidity is detected, valve timing is set for optimal dilution that is near a misfire limit.

17. The method of claim 13, wherein if the humidity of the intake air transiently increases above ambient humidity for which the operating parameters are set, dilution of the cylinder increases, the one or more engine operating parameters is adjusted for a duration that is different than the duration of the transient condition that caused the increased humidity.

18. The method of claim 13, wherein a transient increase in humidity is detected based on a transient load increase that lasts a first duration, wherein the one or more operating parameters is adjusted for a second duration longer than the first duration to compensate for the increased time it takes for the increased humidity, which is now carried to the intake manifold by the intake air, to reach engine cylinders and combust.

19. The method of claim 13, wherein the one or more engine operating parameters includes engine air-fuel ratio, wherein if humidity transiently increases, the air-fuel ratio is decreased and an increased amount of fuel is delivered to maintain torque.

20. The method of claim 13, wherein the one or more engine operating parameters includes engine air-fuel ratio, wherein if humidity transiently increases, the air-fuel ratio may be increased in order to maintain a same amount of oxygen in an engine cylinder.

21. The method of claim 13, wherein the one or more engine operating parameters is spark timing, which is advanced in coordination with an extended release of water into the intake air caused by the dispersion element, to allow additional time for combustion longer than the transient increase in humidity.

22. The engine system of claim 2, wherein all flow exiting the charge air cooler must pass through the mesh-like screen.

* * * * *